United States Patent
Blaumann et al.

(10) Patent No.: US 9,816,509 B2
(45) Date of Patent: Nov. 14, 2017

(54) DEVICE AND METHOD FOR OPERATING PARALLEL CENTRIFUGAL PUMPS

(71) Applicant: ABB TECHNOLOGY AG, Zürich (CH)

(72) Inventors: Marcel Blaumann, Mannheim (DE); Rüdiger Franke, Lampertheim (DE); Olaf Reismann, Mannheim (DE)

(73) Assignee: ABB Schweiz AG, Baden (CH)

( * ) Notice: Subject to any disclaimer, the term of this patent is extended or adjusted under 35 U.S.C. 154(b) by 388 days.

(21) Appl. No.: 14/608,834

(22) Filed: Jan. 29, 2015

(65) Prior Publication Data
US 2015/0148972 A1 May 28, 2015

Related U.S. Application Data

(63) Continuation of application No. PCT/EP2012/067957, filed on Sep. 13, 2012.

(51) Int. Cl.
*G06F 19/00* (2011.01)
*F04D 15/02* (2006.01)
(Continued)

(52) U.S. Cl.
CPC ............. *F04D 15/029* (2013.01); *F04D 1/04* (2013.01); *F04D 13/14* (2013.01); *G05B 15/02* (2013.01); *G06F 17/10* (2013.01)

(58) Field of Classification Search
CPC ........ F04D 13/14; F04D 13/12; F04D 15/029; F04D 15/0072; F04D 1/10; A01M 7/0089; G05B 15/02; G06F 17/10
See application file for complete search history.

(56) References Cited

U.S. PATENT DOCUMENTS 4,584,654 A    4/1986  Crane
4,805,118 A *  2/1989  Rishel ...................... G01L 3/26
                                              340/606
(Continued)

FOREIGN PATENT DOCUMENTS

AU    2008229836 A1    8/2009
EP    2 469 094 A2     6/2012

OTHER PUBLICATIONS

Szychta, Energy Consumption of Water Pumpinh for Selected Control Systems, Electrical Power Quality and Utilisational, Journal, vol. XII, No. 1, 2006.*

(Continued)

*Primary Examiner* — Darrin Dunn
(74) *Attorney, Agent, or Firm* — Barnes & Thornburg LLP

(57) ABSTRACT

A device and a method for operating multiple centrifugal pumps are disclosed. The device can include a communication interface for receiving as at least one input information, an instantaneous pressure drop and an instantaneous flow rate per pump or speed of the centrifugal pumps, and for transmitting output information to the centrifugal pumps, where the output information reflects a reference value for the number of centrifugal pumps to be operated in parallel. The device can contain a data storage unit and a processing unit, which determine from input information and additional information an instantaneous efficiency, a first expected efficiency under the assumption that the actual number is reduced by one, and a second expected efficiency under the assumption that the actual number is increased by one, and which can generate the reference value depending on which of the instantaneous or first expected or second expected efficiencies has a highest value.

17 Claims, 4 Drawing Sheets

(51) Int. Cl.
*F04D 13/14* (2006.01)
*F04D 1/04* (2006.01)
*G05B 15/02* (2006.01)
*G06F 17/10* (2006.01)

(56) References Cited

U.S. PATENT DOCUMENTS

| | | | | |
|---|---|---|---|---|
| 5,789,879 | A * | 8/1998 | Cook | F15B 1/26 318/101 |
| 6,185,946 | B1 * | 2/2001 | Hartman | F04D 15/029 236/1 EA |
| 6,648,606 | B2 * | 11/2003 | Sabini | F04D 15/0088 415/1 |
| 7,107,184 | B2 * | 9/2006 | Gentile | F04D 15/0088 417/63 |
| 7,117,120 | B2 * | 10/2006 | Beck | E21B 43/126 702/182 |
| 8,291,720 | B2 * | 10/2012 | Hartman | F04D 27/0261 62/228.5 |
| 9,388,813 | B2 * | 7/2016 | Kallesoe | F04D 13/14 |
| 2003/0215335 | A1 * | 11/2003 | Crivelli | B01F 5/0415 417/53 |
| 2003/0216879 | A1 * | 11/2003 | Hashemian | G01D 3/08 702/95 |
| 2003/0235492 | A1 * | 12/2003 | Mirsky | F04D 15/029 415/1 |
| 2007/0192062 | A1 * | 8/2007 | Gentile | F04D 15/0088 702/182 |
| 2007/0212229 | A1 * | 9/2007 | Stavale | F04D 15/0088 417/42 |
| 2010/0198409 | A1 * | 8/2010 | Hartman | F04D 27/0261 700/275 |
| 2011/0176933 | A1 * | 7/2011 | Kallesoe | F04D 13/14 417/42 |
| 2013/0017098 | A1 * | 1/2013 | Kallesoe | F04D 13/14 417/44.1 |
| 2013/0108473 | A1 * | 5/2013 | Tamminen | F04B 49/00 417/3 |
| 2013/0204546 | A1 * | 8/2013 | Devine | F04B 51/00 702/45 |
| 2015/0168803 | A1 * | 6/2015 | Xu | G02F 1/353 359/332 |

OTHER PUBLICATIONS

Yang et al., Optimal Schediling and Control of Multi-Pump Boosting System, IEEE, 2010.*
Shiels, Centrifugal Pump Academy, 1997.*
International Search Report (PCT/ISA/210) dated Jun. 3, 2013, by the European Patent Office as the International Searching Authority for International Application No. PCT/EP2012/067957.
Jinguo, "Parallel pumping, IPC technology in parallel pump control", ABB Review; Nov. 1, 2008, XP007921917, pp. 77-81.

* cited by examiner

DEVICE AND METHOD FOR OPERATING PARALLEL CENTRIFUGAL PUMPS

RELATED APPLICATION(S)

This application claims priority as a continuation application under 35 U.S.C. §120 to PCT/EP2012/067957 filed as an International Application on Sep. 13, 2012, designating the U.S., the entire content of which is hereby incorporated by reference in its entirety.

FIELD

The disclosure relates to a device and a method for driving parallel centrifugal pumps, where the device can include a communication interface for receiving at least one input information on a state of operation of the centrifugal pumps and for transmitting at least one output information to one or multiple driving units of the centrifugal pumps. The at least one output information can reflect a reference value for the number of centrifugal pumps to be operated in parallel. Further, the device can include a data storage unit for storing at least one additional information and a processing unit for generating the at least one output information from the at least one input information and the additional information.

BACKGROUND INFORMATION

Centrifugal pumps can be used to convey fluids, such as water, oil or chemicals, and can be, for example, installed as water pumps in the piping network of either a drinking water transmission or distribution system, or a district heating distribution system or a cooling system in a power plant. Depending on the flow rate within the piping network, the number of centrifugal pumps can be determined to be operated in parallel. Accordingly, the number of active parallel centrifugal pumps varies with varying state of the piping network. In addition, the flow rate may be further controlled by adjusting the speed of the active parallel centrifugal pumps via a variable speed controller. Instead of water, for example, other mediums in fluid or gaseous form may be transported by the centrifugal pumps.

Apart from the flow rate, further control objectives for controlling the operation of parallel centrifugal pumps may be defined. For example, in US 2003/0235492 A1, a method is described for controlling a set of centrifugal or axial pumps in a manner that can reduce the chance of any pump operating in a zone in which damage or destruction can occur, which can be achieved by operating the pumps above their respective minimum flow limit, which is called Minimum Continuous Stable Flow (MCSF).

Another control objective can be the saving of energy. In the article "Parallel pumping, IPC technology in parallel pump control" by Li Jinguo, ABB Review Special Report Dancing with the Dragon, November 2008, pp. 77-81, energy savings can be achieved when the flow rate is controlled not via valve settings, as is the traditional method, but via a variable speed drive attached to each pump individually. In the traditional methods, the valve settings can be changed so that the point of operation of the overall system, including pumps, valves and pipes, is shifted from one so called system curve to another, where the system curves are shown as dependency of pressure drop H from flow rate Q and are depicted in the same diagram as the so called pump performance characteristics, which are also functions H=f(Q). In the variable speed control method described in the article, in addition to controlling the flow rate, the variable speed drives operate their corresponding pump at a pre-determined efficient speed which is determined to be lower than the traditional operating speed, while at the same time maintaining the overall efficiency at approximately the same level. When multiple pumps are operated in parallel, one of the corresponding drives can be designated as master drive and all other drives of the parallel pumps follow the reference of the master drive.

SUMMARY

A device is disclosed for operating multiple centrifugal pumps, wherein the centrifugal pumps are of a same type and size and are to be operated at a same speed, the device comprising: a communication interface (I/O) for receiving at least one input information on a state of operation of centrifugal pumps and for transmitting at least one output information to at least one driving unit of the centrifugal pumps, where the at least one output information reflects a reference value for a number of centrifugal pumps to be operated in parallel, the communication interface (I/O) being arranged to receive as input information, an instantaneous pressure drop ($H\_i$) across and an instantaneous flow rate per pump ($Q\_i$) or speed ($n\_i$) of the centrifugal pumps which are to be currently operated in parallel; a data storage unit (MEM) for storing at least one additional information, as an actual number ($m\_a$) of currently operated centrifugal pumps and a rated speed ($n\_r$) of the centrifugal pumps; and a processing unit (PU) for generating the at least one output information from the at least one input information and the additional information, the processing unit (PU) being configured to determine from the input information and the additional information an instantaneous efficiency ($E\_i$), a first expected efficiency ($E\_e1$) under an assumption that an actual number ($m\_a$) is reduced by one, and a second expected efficiency ($E\_e2$) under an assumption that the actual number ($m\_a$) is increased by one, and to generate a reference value (m) depending on which of the instantaneous ($E\_i$) or the first expected or second expected efficiencies ($E\_e1$, $E\_e2$) has a highest value.

A method for operating multiple centrifugal pumps, the method comprising: receiving at least one input information on a state of operation of the centrifugal pumps, and transmitting at least one output information to one or multiple driving units (DU) of the centrifugal pumps, where the at least one output information reflects a reference value (m) for a number of centrifugal pumps to be operated in parallel; storing at least one additional information; generating the at least one output information from the at least one input information and the additional information; receiving as input information an instantaneous pressure drop ($H\_i$) across, and an instantaneous flow rate per pump ($Q\_i$) or speed ($n\_i$) of, the centrifugal pumps currently operated in parallel, where the centrifugal pumps are of a same type and size; storing as additional information an actual number ($m\_a$) of currently operated centrifugal pumps and a rated speed ($n\_r$) of the centrifugal pumps; determining from the instantaneous pressure drop ($H\_i$): the instantaneous flow rate per pump or the instantaneous speed ($Q\_i$, $n\_i$); the actual number ($m\_a$) as well as the rated speed ($n\_r$); an instantaneous efficiency ($E\_i$), a first expected efficiency ($E\_e1$) under an assumption that the actual number ($m\_a$) is reduced by one, and a second expected efficiency ($E\_e2$) under an assumption that the actual number ($m\_a$) is increased by one; and generating the reference value (m)

depending on which of the instantaneous (E_i) or first expected or second expected efficiencies (E_e1, E_e2) has a highest value.

BRIEF DESCRIPTION OF THE DRAWINGS

The disclosure is explained below with reference to the exemplary embodiments shown in the drawings. In the drawings.

DETAILED DESCRIPTION

In accordance with an exemplary embodiment, a device and method are disclosed for operating parallel centrifugal pumps at a desired flow rate and with a reduced energy demand.

In accordance with an exemplary embodiment, the centrifugal pumps can be of the same type and size, such that their characteristic curves, which will be described in more detail below, do not deviate from each other considerably. Further, the centrifugal pumps can be operated at the same speed. In addition, the communication interface of the device can be adapted to receive as input information an instantaneous pressure drop across and an instantaneous flow rate per pump or speed of the centrifugal pumps which can be currently operated in parallel, and the data storage unit can be adapted to store as additional information an actual number of currently operated centrifugal pumps and a rated speed of the centrifugal pumps.

In accordance with an exemplary embodiment, the processing unit can be arranged to determine from the input information and the additional information an instantaneous efficiency, a first expected efficiency under the assumption that the actual number is reduced by one, and a second expected efficiency under the assumption that the actual number is increased by one, and to generate the reference value depending on which of the instantaneous or first expected or second expected efficiencies has the highest value.

In accordance with an exemplary embodiment, the device can find an answer to the question, whether the overall demand of electric energy and thereby the overall demand of electric current can be reduced for the parallel running centrifugal pumps if one pump more or less is included. In accordance with an exemplary embodiment, this can be done by finding the constellation with the highest efficiency value, as the efficiency is inversely proportional to the current consumption of the pumps. The number of currently operated centrifugal pumps can then be changed accordingly, by the one or multiple driving units.

In accordance with an exemplary embodiment, the method according to the disclosure can include all the steps performed by the elements and units contained in the device.

Figure 1:
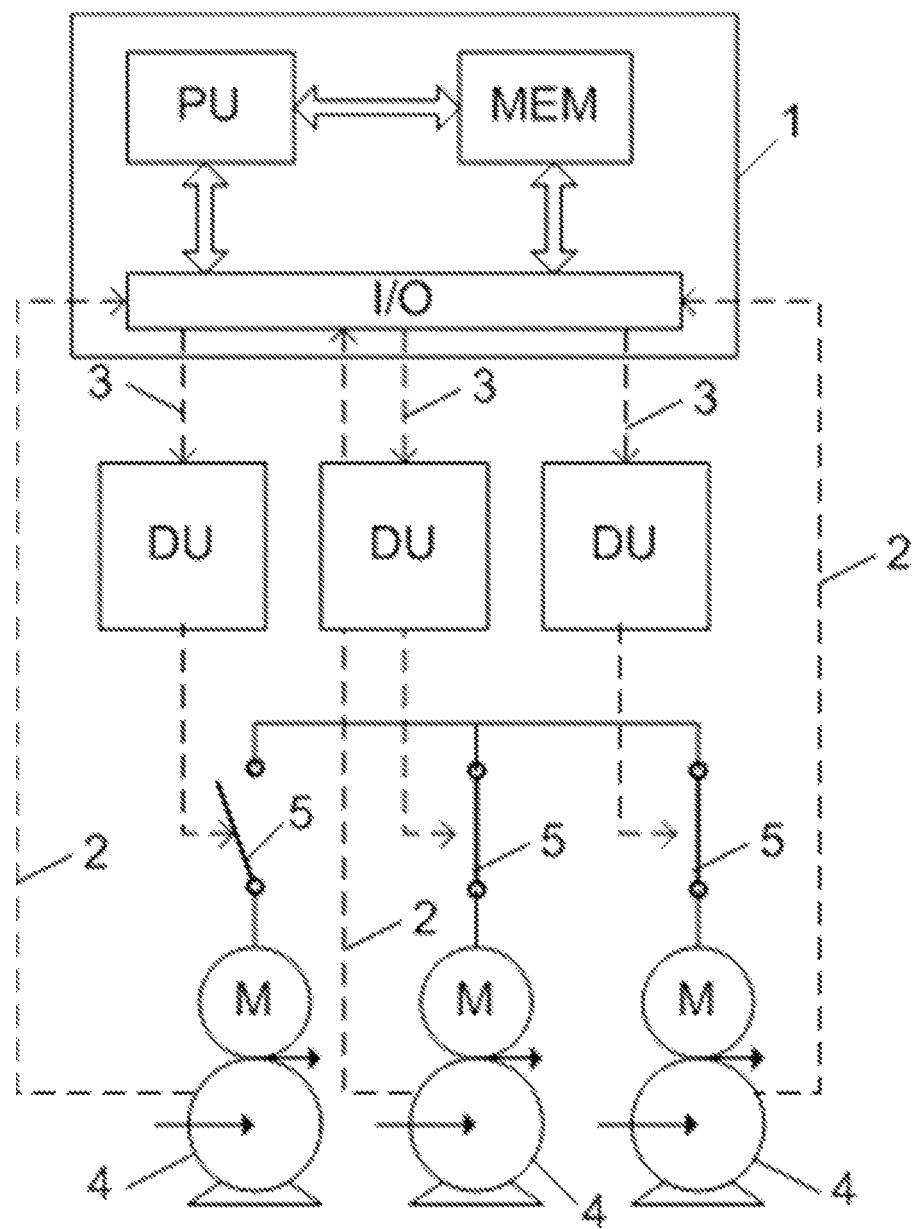
FIG. 1 is an illustration of an exemplary device and a first system for operating multiple centrifugal pumps in accordance with an exemplary embodiment.

In FIG. 1, an exemplary device 1 is shown which can include a processing unit PU, a data storage unit MEM, and a communication interface I/O. In accordance with an exemplary embodiment, the device 1 can communicate with three driving units DU which can each be connected to an electric switching unit 5. Each switching unit 5 can be connected to an electric motor (M) which can be adapted to drive a centrifugal pump 4 and which can electrically be connected in parallel to the other motors M when the corresponding switching unit 5 is closed. The two centrifugal pumps 4 to the right can be currently operated in parallel as their corresponding switching units 5 are closed.

The communication interface I/O, which may receive and transmit analogue and/or digital data, is adapted (i.e., configured) to receive as input information 2 an instantaneous pressure drop H_i across the centrifugal pumps 4 which can be currently operated in parallel, where due to the parallel operation the instantaneous pressure drop H_i is the same for all respective pumps. Further, to input information 2 belongs an instantaneous flow rate per pump Q_i or an instantaneous speed n_i. The pumps 4 can be operated so that their instantaneous speed n_i is the same. Accordingly, since the pumps 4 are of the same type and size, the instantaneous flow rate per pump Q_i should be the same for all currently running pumps as well. The instantaneous pressure drop H_i, the instantaneous flow rate per pump Q_i and/or the instantaneous speed n_i may be represented by either a mean value of measurement data taken at all running pumps 4 or by just a representative value from one of the running pumps.

The data storage unit MEM, which may be a permanent or just a volatile data memory, can be adapted to store as additional information a rated speed n_r, which can be the same for all centrifugal pumps 4, and an actual number m_a of centrifugal pumps 4 which can be currently operated in parallel. In this example, the actual number m_a could be two.

The processing unit PU can be adapted to determine from the input information 2, for example, from the instantaneous pressure drop H_i, the instantaneous flow rate per pump Q_i or the instantaneous speed n_i, the actual number m_a and the rated speed n_r, an instantaneous efficiency E_i, a first expected efficiency E_i1 under the assumption that the actual number m_a is reduced by one, and a second expected efficiency E_i2 under the assumption that the actual number m_a is increased by one.

Afterwards, in accordance with an exemplary embodiment, the processing unit PU can generate as output information 3, a reference value m for the number of centrifugal pumps 4 to be operated in parallel depending on which of the instantaneous (E_i) or first expected or second expected efficiencies (E_e1, E_e2) can have the highest value. For example, if the instantaneous efficiency E_i can have the highest value, the reference value m is determined to be the same as the actual value m_a, for example, no further pump 4 is activated or deactivated. If the first instantaneous efficiency E_i1 can have the highest value, the reference value m is the actual number m_a reduced by one, meaning that one of the currently running pumps is deactivated. If the second instantaneous efficiency E_i2 can have the highest value, the reference value m is the actual number m_a increased by one, resulting in the activation of one more pump.

Figure 2:
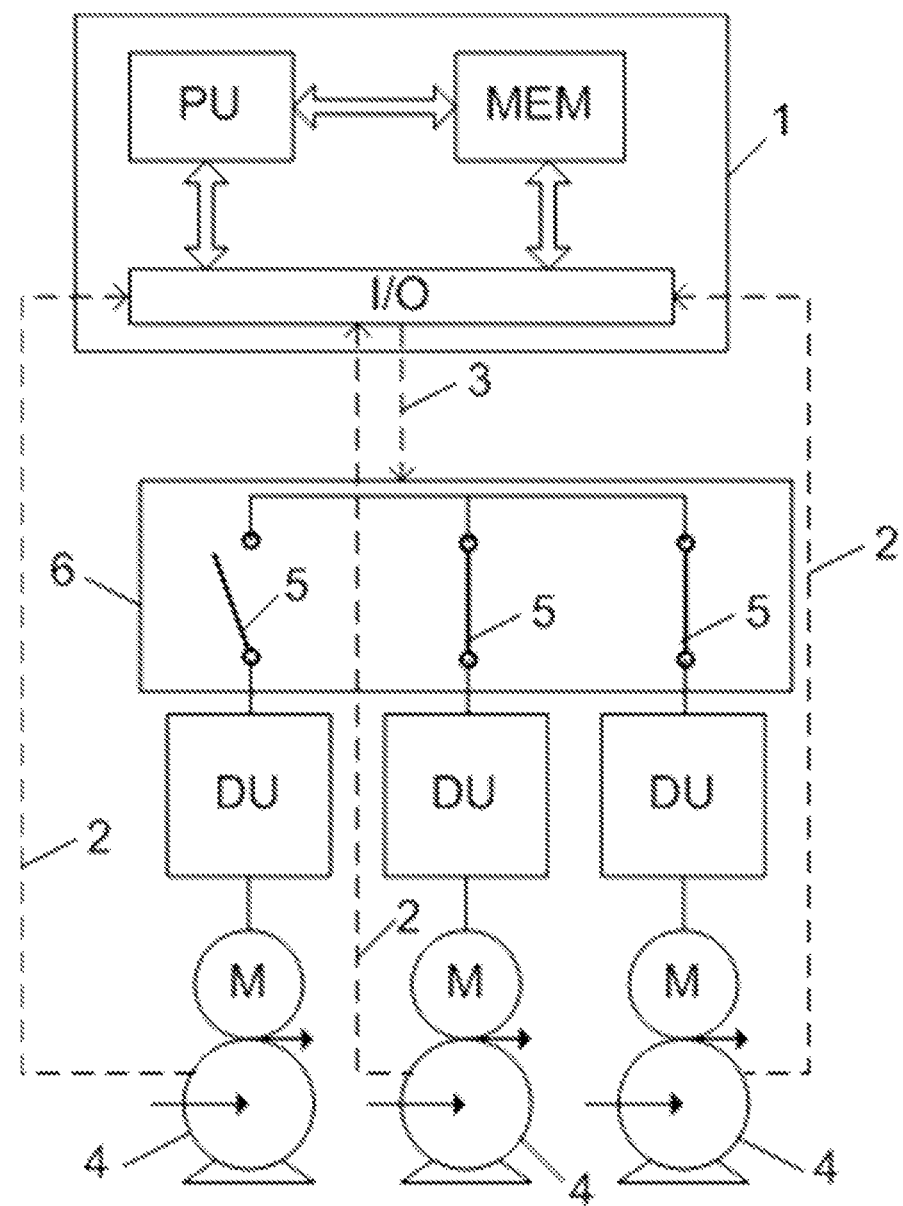
FIG. 2 is an illustration of the exemplary device and a second system for operating multiple centrifugal pumps.

In accordance with an exemplary embodiment, in order to carry out the activation or deactivation of one more pump, the reference value m can be transferred as output information 3 by the communication interface I/O to external units, such as the driving units DU (FIG. 1) or a switchover unit 6 (FIG. 2), where the reference value m may be represented in different forms; for example, as just a number, or in the form of an indication of which of the pumps 4 is to be activated or deactivated or in the form of a binary on/off signal for a certain pump. The form of the output information can depend on two aspects: first, the kind of implementation of the driving units DU and the switching units 5, respectively, and second, whether each centrifugal pump is connected to its own driving unit DU, as in the example of FIG. 1, or whether the device 1 communicates with just one central unit, as shown in FIG. 2. The driving units DU may be implemented for example as a hydraulic coupling, also known as hydrodynamic fluid coupling, or as a variable speed drive VSD, where each DU drives the corresponding motor M so that it outputs a continuously variable speed and/or torque.

FIG. 2 shows an exemplary system as compared to FIG. 1 which can include the same device 1, motors M and centrifugal pumps 4, but a different set-up for the switching units 5 and the driving units DU. The switching units 5 can be implemented in an auto switchover unit 6, as disclosed in the ABB Technical Information No. 30/72-2925-1 EN "Functional module: CA-Auto switchover". The auto switchover unit 6 can be an automatic change-over switch that can activate two to six individual driving units DU according to a given priority. When using such an auto switchover unit 6, the reference value m needs to be transformed into the necessary priority information in order to activate or deactivate the desired pump, for example, the output information 3 can contain the priority information.

Figure 3:
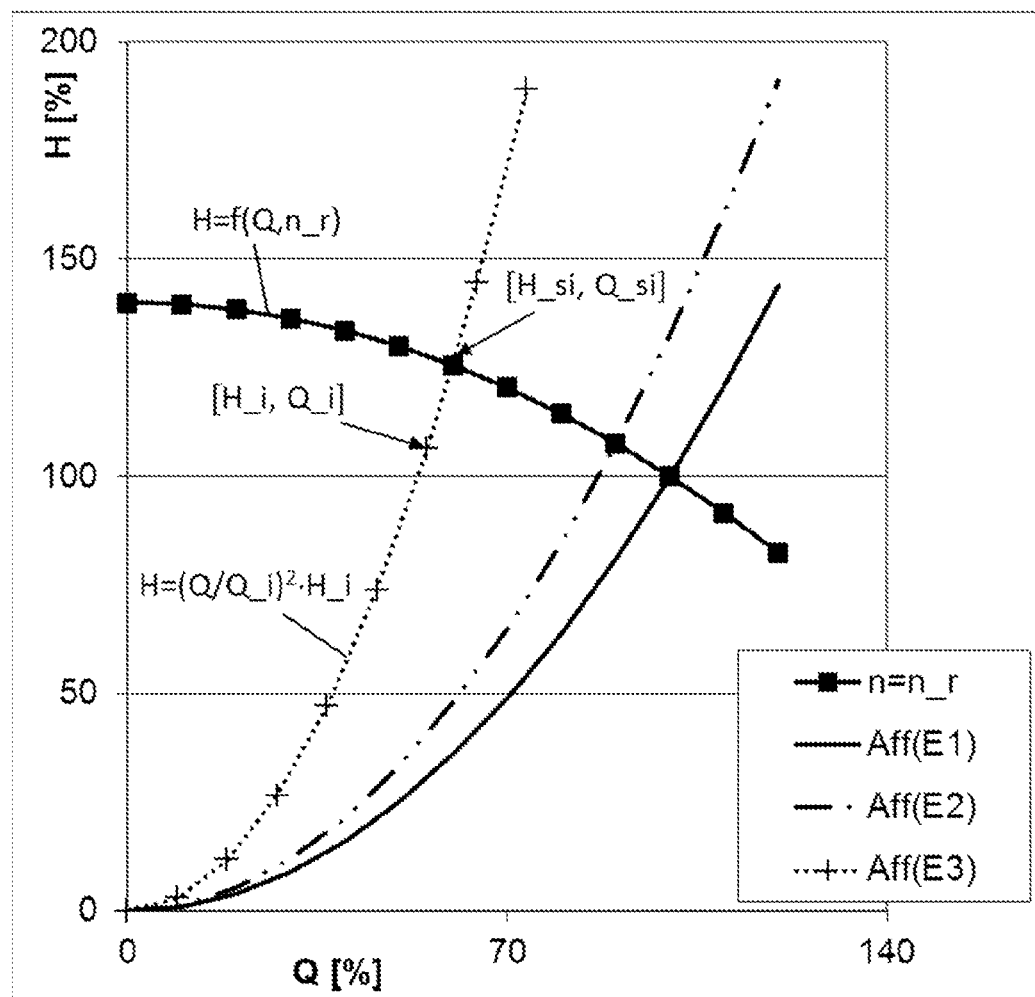
FIG. 3 is an illustration of an exemplary pump performance characteristic and affinity law curves in accordance with an exemplary embodiment.
Figure 4:
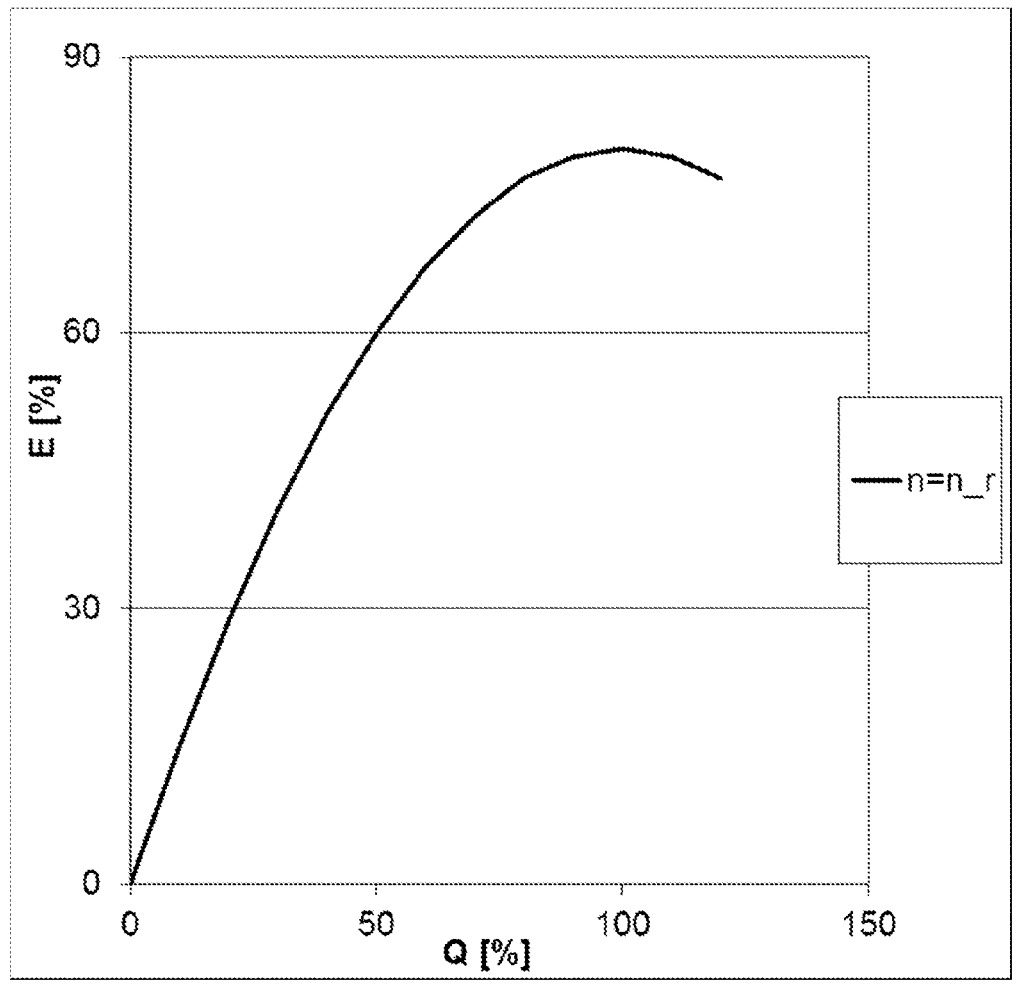
FIG. 4 is an illustration of an efficiency characteristic versus flow rate in accordance with an exemplary embodiment.

In accordance with an exemplary embodiment, the data storage unit MEM can be arranged to store as additional information an efficiency characteristic versus flow rate of the centrifugal pumps 4, as shown in FIG. 4, and a pump performance characteristic at rated speed n_r of the centrifugal pumps 4, as shown in FIG. 3. The dependency of efficiency E from flow rate Q, E=f(Q), can be approximately the same for each centrifugal pump 4 since the pumps are of the same type and size, so that one and the same characteristic curve can be used for all pumps. In order to be able to make that assumption, the peak value E_max should not deviate more than, for example, 5% between the efficiency characteristics of different centrifugal pumps 4.

The pump performance characteristic H=f(Q, n_r) shows the dependence of pressure drop H on flow rate Q at rated speed n_r, where the pump performance characteristic can be assumed to be the same for each centrifugal pump 4, provided that statistical dispersion of the actual real pump performance characteristics of pumps 4 is less than, for example, 20%.

In an exemplary embodiment, the processing unit PU can be arranged to determine from the input information 2, the additional information and the pump performance characteristic (FIG. 3, H=f(Q, n_r)), a scaled instantaneous flow rate per pump Q_si, a scaled first expected flow rate per pump Q_s1 and a scaled second expected flow rate per pump Q_s2, where the scaling can be performed as if the centrifugal pumps 4 were operated at rated speed n_r while keeping the efficiency at the same level as the instantaneous efficiency E_i or the first or the second expected efficiencies E_i1, E_i2, respectively. The processing unit PU can further be arranged to determine from the efficiency characteristic versus flow rate (FIG. 4, E=f(Q)), the corresponding instantaneous efficiency E_i, first expected efficiency E_e1 and second expected efficiency E_e2, respectively, belonging to the scaled instantaneous flow rate Q_si, the scaled first expected flow rate Q_s1 and the scaled second expected flow rate Q_s2, respectively.

In accordance with an exemplary embodiment, the processing unit PU can be arranged to determine the first expected flow rate per pump Q_e1 and the second expected flow rate per pump Q_e2, respectively, by finding a crossing point between the pump performance characteristic and an affinity law for a fixed impeller diameter of the centrifugal pumps, under the assumption that the centrifugal pumps are operated at rated speed n_r, the pressure drop is kept constant at the level of the instantaneous pressure drop H_i and that the flow rate per pump is increased or decreased linearly from the level of the instantaneous flow rate per pump Q_i by decreasing or increasing the actual number m_a by one, respectively, thereby resulting in a first Q_i1 or second Q_i2 expected instantaneous flow rate per pump, respectively.

The first affinity law is depicted in FIG. 3 as the curves Aff(E1), Aff(E2) and Aff(E3), where the first affinity law is applied to each curve in the form H=(Q/Q_i)$^2$·H_i and where each curve corresponds to a constant efficiency value E1, E2 or E3. The first affinity law $$H=(Q/Q\_i)^2 \cdot H\_i \qquad [1]$$

is derived from the known basic affinity laws for any pair of different pressure drops $H_1$ and $H_2$ and the corresponding speed $n_1$ and $n_2$, as well as flow rates $Q_1$ and $Q_2$:

$$H\_1/H\_2=(n\_1/n\_2)^2 \text{ and } Q\_1/Q\_2=n\_1/n\_2.$$

As is reflected by these affinity laws, the flow rate Q is proportional to the speed n, for example, the rotation speed of the centrifugal pumps, and the pressure drop H, also called the lift, is proportional to the square of the speed n.

The exemplary embodiment can be based solely on pump related variables and characteristics, which can be in contrast to the methods known from the above cited article "Parallel pumping, IPC technology in parallel pump control", where the characteristics of the overall piping system containing the pumps, valves, pipes are required to be known in order to determine an energy saving mode of operation of the pumps. The characteristics of the overall piping system can take into account friction losses, valve positions and differences in height which the system has to cover, and they can be difficult to obtain, for example, when the elements of the system have changing characteristics, as is the case for control valves. In the exemplary embodiment, pump performance characteristic and efficiency characteristic can be used instead together with the well-known affinity laws for centrifugal pumps with fixed impeller diameter. These characteristics remain the same even if the characteristics of the overall piping system has changed, so that the proposed device and method for operating multiple centrifugal pumps can reliably be applied without the need to adapt any characteristics during operation.

In an exemplary embodiment, the processing unit PU can be arranged to determine the first and second expected instantaneous flow rates per pump Q_i1, Q_i2 by multiplying the instantaneous flow rate per pump Q_i with the actual number m_a divided by the actual number reduced by one (m_a−1) or by the actual number increased by one (m_a+1), respectively:

$$Q\_i1=Q\_i \cdot m\_a/(m\_a-1) \text{ and } Q\_i2=Q\_i \cdot m\_a/(m\_a+1).$$

In case that no instantaneous flow rate per pump Q_i is available, for example, the input information 2 contains the instantaneous speed n_i instead, the processing unit PU can be arranged to determine the instantaneous flow rate per pump Q_i from the instantaneous pressure drop H_i, the instantaneous speed n_i and the rated speed n_r by applying a second and a third affinity law for a fixed impeller diameter of the centrifugal pumps and the pump performance characteristic. The second affinity law is derived from the basic affinity law $$H\_1/H\_2 = (n\_1/n\_2)^2$$

resulting in $$H\_si = (n\_r/n\_i)^2 \cdot H\_i \quad [2]$$

with H_si being the scaled instantaneous pressure drop.

From the pump performance characteristic of FIG. 3, the processing unit PU may then find the scaled instantaneous flow rate per pump Q_si corresponding to the scaled instantaneous pressure drop H_si.

With Q_si, the third affinity law delivers the instantaneous flow rate per pump Q_i:

$$Q\_i = n\_i/n\_r \cdot Q\_si \quad [3]$$

For example, in case the input information 2 contains the instantaneous flow rate per pump Q_i and not the instantaneous speed n_i, the processing unit PU may be arranged to determine the scaled instantaneous flow rate per pump Q_si by finding a crossing point between the pump performance characteristic and the first affinity law for a fixed impeller diameter of the centrifugal pumps under the assumption that the centrifugal pumps 4 are operated at rated speed n_r, where the first affinity law is applied to the instantaneous pressure drop H_i and the instantaneous flow rate per pump Q_i.

The crossing point between the pump performance characteristic H=f(Q, n_r) and the first affinity law H=(Q/Q_i)²·H_i can be derived by processing unit PU for example through iteration, until the following relationship is true:

$$H(Q\_si, n\_r) = H\_si = (Q\_si/Q\_i)^2 \cdot H\_i.$$

This results in the determination of the crossing point [H_si, Q_si], as is shown in FIG. 3.

In the same way, the scaled first and second expected flow rates per pump Q_s1, Q_s2 can be determined from the crossing points of the first affinity law with the pump performance characteristic, where the first affinity law is applied to the instantaneous pressure drop H_i and the scaled first and second expected instantaneous flow rates per pump Q_s1 and Q_s2, respectively:

$$H(Q\_i1, n\_r) = H\_s1 = (Q\_s1/Q\_i1)^2 \cdot H\_i,$$

$$H(Q\_i2, n\_r) = H\_s2 = (Q\_s2/Q\_i2)^2 \cdot H\_i,$$

In accordance with an exemplary embodiment, the method steps shall now be summarized again from the beginning, as they are performed by the device 1 for operating multiple centrifugal pumps.

Given are the pump performance characteristic H=f(Q, n_r), the rated speed n_r and the actual number of currently operated pumps m_a. The instantaneous pressure drop H_i and the instantaneous flow rate per pump Q_i can be received as input information.

From the instantaneous flow rate per pump Q_i and the actual number m_a, the first and second expected instantaneous flow rates Q_i1 and Q_i2 can be determined:

$$Q\_i1 = Q\_i \cdot m\_a/(m\_a - 1) \text{ and } Q\_i2 = Q\_i \cdot m\_a/(m\_a + 1).$$

From the three instantaneous flow rates per pump, Q_i, Q_i1 and Q_i2, each representing a different number of parallel operated pumps, the corresponding scaled flow rate per pump, Q_si, Q_s1 and Q_s2, can be obtained by iteratively finding the crossing point of the above described first affinity law [1] with the pump performance characteristic H=f(Q, n_r).

The following relationships are true in the respective crossing point:

$$H\_si = (Q\_si/Q\_i)^2 \cdot H\_i,$$

$$H\_s1 = (Q\_s1/Q\_i1)^2 \cdot H\_i,$$

$$H\_s2 = (Q\_s2/Q\_i2)^2 \cdot H\_i,$$

with H_si and Q_si being the scaled instantaneous pressure drop and flow rate per pump, respectively, H_s1, Q_s1 being the scaled first expected pressure drop and flow rate per pump, respectively, and H_s2, Q_s2 being the scaled second expected pressure drop and flow rates per pump, respectively.

Afterwards, as already described, the efficiency values E_i, E_e1 and E_e2 corresponding to the scaled instantaneous flow rate per pump Q_si and to the scaled first and second expected flow rates per pump Q_s1 and Qs2, respectively, can then be derived by processing unit PU from the efficiency characteristic versus flow rate shown in FIG. 4; and depending on which of the three efficiency values E_i, E_e1 and E_e2 is the highest, it can be defined whether the number of currently running parallel pumps should be increased or reduced by one or kept constant, for example, the reference value m is set to be m=m_a or m=m_a−1 or m=m_a+1.

Afterwards, for example, when the number of currently running pumps has been changed, the processing unit PU may repeat the foregoing described steps in order to further reduce the energy demand of the parallel pumps 4. Accordingly, the processing unit PU may be arranged to determine an updated reference value m_u for the number of centrifugal pumps to be operated in parallel by repeating the already described determinations after having successfully changed the number of centrifugal pumps operated in parallel to the reference value m.

In accordance with an exemplary embodiment, in order to help ensure that no operational or physical constraints of the piping system are violated, the processing unit PU may further be arranged to check whether the first and/or second expected instantaneous flow rates per pump Q_i1, Q_i2 exceed a minimum threshold Q_min or a maximum threshold Q_max and if so, to not take the corresponding expected efficiency E_e1, E_e2 into account when generating the reference value m. As a result, the number of currently operated pumps will be changed only in a direction where it is safe.

In an exemplary embodiment, the processing unit PU may be arranged to determine which of the centrifugal pumps 4 has the lowest number of operating hours and, in case that the reference value m indicates that the actual number is to be increased by one, to generate as output information 3 an activation information for this particular centrifugal pump. As a result, the centrifugal pumps can each be put into operation for a comparable amount of time so that they are worn as evenly as possible.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Apparatus comprising:
multiple centrifugal pumps, wherein the centrifugal pumps are of a same type and size and are to be operated at a same speed:
a device for operating the centrifugal pumps, the device comprising:
a communication interface for receiving at least one input information on a state of operation of the centrifugal pumps and for transmitting at least one output information to at least one driving unit of the centrifugal pumps, wherein the at least one output information reflects a reference value for a number of the centrifugal pumps to be operated in parallel and wherein the communication interface is arranged to receive as input information: (i) an instantaneous pressure drop ($H\_i$) across the centrifugal pumps which are to be currently operated in parallel and (ii) an instantaneous flow rate per pump ($Q\_i$) or speed ($n\_i$) of the centrifugal pumps which are to be currently operated in parallel:
a data storage unit for storing as additional information: an actual number ($m\_a$) of currently operated centrifugal pumps, a rated speed ($n\_r$) of the centrifugal pumps, an efficiency characteristic versus flow rate at the rated speed ($n\_r$), and a pump performance characteristic at the rated speed ($n\_r$) of the centrifugal pumps; and
a processor for generating the at least one output information from the at least one input information and the additional information, the processor being configured (i) to determine from the at least one input information and the additional information an instantaneous efficiency ($E\_i$) if a first expected efficiency ($E\_1$) where the actual number ($m\_a$) is reduced by one, and a second expected efficiency ($E\_e2$) where the actual number ($m\_a$) is increased by one, (ii) to generate a reference value ($m$) depending on which of the instantaneous efficiency ($E\_i$) if the first expected efficiency ($E\_e1$), and the second expected efficiency ($E\_e2$) has a highest value, and (iii) to determine from the input information and the additional information, a scaled instantaneous flow rate per pump ($Q\_s1$), a scaled first expected flow rate per pump ($Q\_s1$) and a scaled second expected flow rate per pump ($Q\_s2$), where the scaling is performed using the rated speed ($n\ r$) for the centrifugal pumps while keeping efficiency at a same level as the instantaneous efficiency ($E\_i$), the first expected efficiency ($E\_i1$), and the second expected efficiency ($E\_i2$), respectively, from the efficiency characteristic versus flow rate,
wherein the multiple centrifugal pumps are configured to be operated in response to the at least one output information.

2. The apparatus according to claim 1, wherein the processor is configured to determine the scaled first expected flow rate per pump ($Q\_s1$) and the scaled second expected flow rate per pump ($Q\_s2$), respectively, by finding a crossing point between the pump performance characteristic and a first affinity law for a fixed impeller diameter of centrifugal pumps to be operated, where the centrifugal pumps are operated at rated speed ($n\_r$), the pressure drop is kept constant at the instantaneous pressure drop ($H\_i$), and the flow rate per pump is increased or decreased linearly from the level of the instantaneous flow rate per pump ($Q\_i$) by decreasing or increasing the actual number ($m\_a$) by one, respectively, thereby resulting in a first ($Q\_i1$) or second ($Q\_i2$) expected instantaneous flow rate per pump, respectively, and wherein the first affinity law is:

$$H=(Q/Q\_i)^2 \cdot H\_i.$$

3. The apparatus according to claim 2, wherein the processor is configured to determine the first and second expected instantaneous flow rates per pump ($Q\_i1$, $Q\_i2$) by multiplying the instantaneous flow rate per pump ($Q\_i$) with the actual number ($m\_a$) divided by the actual number reduced by one ($m\_a-1$) or by the actual number increased by one ($m\_a+1$), respectively, and, in a case that no instantaneous flow rate per pump ($Q\_i$) is available, to determine the instantaneous flow rate per pump ($Q\_i$) from the instantaneous pressure drop ($H\_i$), the instantaneous speed ($n\_i$) and the rated speed ($n\_r$) by applying a second affinity law and a third affinity law for a fixed impeller diameter of the centrifugal pumps to be operated and the pump performance characteristic, wherein the second affinity law is:

$$H\_si=(n\_r/n\_i)^2 * Hi \text{ and the third affinity law is:}$$

$$Q\_1=n\_i/n\_r * Q\_si.$$

4. The apparatus according to claim 3, wherein the processor is configured to determine the instantaneous flow rate per pump ($Q\_i$) by determining:
firstly a rated instantaneous pressure drop ($H\_si$) from the second affinity law applied to the instantaneous pressure drop ($H\_i$);
secondly the scaled instantaneous flow rate per pump ($Q\_si$) from the pump performance characteristic at the scaled instantaneous pressure drop ($H\_si$); and
thirdly the instantaneous flow rate per pump ($Q\_i$) from the third affinity law applied to the scaled instantaneous flow rate per pump ($Q\_si$).

5. The apparatus according to claim 2, wherein the processor is configured to determine the scaled instantaneous flow rate per pump ($Q\_si$) by finding a crossing point between the pump performance characteristic and the first affinity law for a fixed impeller diameter of the centrifugal pumps where the centrifugal pumps are operated at rated speed ($n\_r$) and where the first affinity law is applied to the instantaneous pressure drop ($H\_i$) and the instantaneous flow rate per pump ($Q\_i$).

6. The apparatus according to claim 2, wherein the processor is configured to determine the scaled instantaneous flow rate per pump ($Q\_si$) by finding a crossing point between the pump performance characteristic and the first affinity law for a fixed impeller diameter of the centrifugal pumps where the centrifugal pumps are operated at rated speed ($n\_r$) and where the first affinity law is applied to the instantaneous pressure drop ($H\_i$) and the instantaneous flow rate per pump ($Q\_i$).

7. The apparatus according to claim 1, wherein the processor is configured to determine an updated reference value ($m\_u$) for the number of centrifugal pumps to be operated in parallel after having successfully changed the number of centrifugal pumps operated in parallel to the reference value ($m$).

8. The apparatus according to claim 1, wherein the processor is configured to check whether at least one of the first and/or second expected instantaneous flow rates per pump ($Q\_i1$, $Q\_i2$) is outside of a minimum or a maximum threshold ($Qmin$, $Qmax$) and, if so, to not take the corresponding expected efficiency ($E\_e1$, $E\_e2$) into account when generating the reference value ($m$).

9. The apparatus according to claim 1, wherein the processor is configured to determine which of the centrifugal pumps has a lowest number of operating hours and, in case that the reference value ($m$) indicates that the actual number is to be increased by one, to generate as output information, an activation information for this particular centrifugal pump.

10. A method for operating multiple centrifugal pumps, the method comprising:
- receiving as input information (i) an instantaneous pressure drop (H_i) across the centrifugal pumps currently operated in parallel and (ii) an instantaneous flow rate per pump (Q_i) or speed (n_i) of the centrifugal pumps currently operated in parallel, wherein the centrifugal pumps are of a same type and size;
- determining, using the instantaneous pressure drop (H_i):
  - the instantaneous flow rate per pump or the instantaneous speed (Q_i, n_i);
  - an actual number (m_a) of currently operated centrifugal pumps and a rated speed (n_r) of the centrifugal pumps; and
  - an instantaneous efficiency (E_i), a first expected efficiency (E_e1) where the actual number (m_a) is reduced by one, and a second expected efficiency (E_e2) where the actual number (m_a) is increased by one;
- storing as additional information the actual number (m_a) of currently operated centrifugal pumps, the rated speed (n_r) of the centrifugal pumps, an efficiency characteristic versus flow rate at rated speed (n_r), and a pump performance characteristic at rated speed (n_r) of the centrifugal pumps;
- determining, from the input information and the additional information, a scaled instantaneous flow rate per pump (Q_si), a scaled first expected flow rate per pump (Q_s1), and a scaled second expected flow rate per pump (Q_s2), where the scaling is performed using the rated speed (n_r) for the centrifugal pumps while keeping efficiency at a same level as the instantaneous efficiency (E_e), the first expected efficiency (E_i1), and the second expected efficiency (E_i2), respectively, from the efficiency characteristic versus flow rate;
- generating a reference value (m) depending on which of the instantaneous efficiency (E_i), the first expected efficiency (E_e1), and the second expected efficiency (E_e2) has a highest value for a number of the centrifugal pumps to be operated in parallel;
- transmitting at least one output information to at least one driving unit of the centrifugal pumps, where the at least one output information reflects the reference value (m); and
- operating the centrifugal pumps in response to the at least one output information.

11. The method according to claim 10, comprising:
- determining the scaled first expected flow rate per pump (Q_s1) and the scaled second expected flow rate per pump (Q_s2), respectively, by finding a crossing point between the pump performance characteristic and a first affinity law for a fixed impeller diameter of the centrifugal pumps, where the centrifugal pumps are operated at rated speed (n_r), the pressure drop is kept constant at the instantaneous pressure drop (H_i), and the flow rate per pump is increased or decreased linearly from a level of the instantaneous flow rate per pump (Q_i) by decreasing or increasing the actual number (m_a) by one, respectively, thereby resulting in a first (Q_i1) or second (Q_i2) expected instantaneous flow rate per pump, respectively, and wherein the first affinity law is:

$$H = (Q/Q\_i)^2 \cdot H\_i.$$

12. The method according to claim 11, comprising:
- determining the first and second expected instantaneous flow rates per pump (Q_i1, Q_i2) by multiplying the instantaneous flow rate per pump (Q_i) with the actual number (m_a) divided by the actual number reduced by one (m_a−1) or by the actual number increased by one (m_a+1), respectively, and, in case that no instantaneous flow rate per pump (Q_i) is available, to determine the instantaneous flow rate per pump (Q_i) from the instantaneous pressure drop (H_i), the instantaneous speed (n_i) and the rated speed (n_r) by applying a second affinity law and a third affinity law for a fixed impeller diameter of the centrifugal pumps and the pump performance characteristic, wherein the second affinity law is:

$$H\_si = (n\_r/n\_i)^2 \cdot H\_i$$

and the third affinity law is:

$$Q\_1 = n\_i/n\_r \cdot Q\_si.$$

13. The method according to claim 12, comprising:
- determining the instantaneous flow rate per pump (Q_i) by:
  - applying a rated instantaneous pressure drop (H_si) from the second affinity law to the instantaneous pressure drop (H_i);
  - determining the scaled instantaneous flow rate per pump (Q_si) from the pump performance characteristic at the scaled instantaneous pressure drop (H_si);
  - and applying the instantaneous flow rate per pump (Q_i) from the third affinity law to the scaled instantaneous flow rate per pump (Q_si).

14. The method according to claim 11, comprising:
- determining the scaled instantaneous flow rate per pump (Q_si) by finding a crossing point between the pump performance characteristic and the first affinity law for a fixed impeller diameter of the centrifugal pumps where the centrifugal pumps are operated at rated speed (n_r), and where the first affinity law is applied to the instantaneous pressure drop (H_i) and the instantaneous flow rate per pump (Q_i).

15. The method according to claim 12, comprising:
- determining the scaled instantaneous flow rate per pump (Q_si) by finding a crossing point between the pump performance characteristic and the first affinity law for a fixed impeller diameter of the centrifugal pumps where that the centrifugal pumps are operated at rated speed (n_r), and where the first affinity law is applied to the instantaneous pressure drop (H_i) and the instantaneous flow rate per pump (Q_i).

16. The method according to claim 10, comprising:
- providing an updated reference value (m_u) for the number of centrifugal pumps to be operated in parallel by repeating the determining step(s) after having successfully changed the number of centrifugal pumps operated in parallel to the reference value (m).

17. The method according to claim 10, comprising:
- checking whether at least one of the first and/or second expected instantaneous flow rates per pump (Q_i1, Q_i2) is outside of a minimum or a maximum threshold (Q_min, Q_max) and, if so, excluding a corresponding expected efficiency (E_e1, E_e2) from the generating of the reference value (m).

* * * * *